US012589359B2

(12) United States Patent
Berends

(10) Patent No.: US 12,589,359 B2
(45) Date of Patent: Mar. 31, 2026

(54) MEMBRANE HOLDER AND MEMBRANE MODULE

(71) Applicant: NX Filtration B.V., Enschede (NL)

(72) Inventor: Hendrik Johan Ferdinand Berends, Enschede (NL)

(73) Assignee: NX FILTRATION B.V., Enschede (NL)

( * ) Notice: Subject to any disclaimer, the term of this patent is extended or adjusted under 35 U.S.C. 154(b) by 378 days.

(21) Appl. No.: 18/559,463

(22) PCT Filed: May 5, 2022

(86) PCT No.: PCT/EP2022/062214
§ 371 (c)(1),
(2) Date: Nov. 7, 2023

(87) PCT Pub. No.: WO2022/238243
PCT Pub. Date: Nov. 17, 2022

(65) Prior Publication Data
US 2024/0238730 A1 Jul. 18, 2024

(30) Foreign Application Priority Data
May 14, 2021 (EP) .................................... 21173853

(51) Int. Cl.
B01D 63/04 (2006.01)

(52) U.S. Cl.
CPC ........ B01D 63/04 (2013.01); B01D 2313/025 (2013.01); B01D 2313/08 (2013.01)

(58) Field of Classification Search
CPC .............. B01D 63/04; B01D 2313/025; B01D 2313/08; B01D 2313/10; B01D 2313/56; B01D 2321/04; B01D 63/02
USPC ....................................................... 210/321.9
See application file for complete search history.

(56) References Cited

U.S. PATENT DOCUMENTS

| | | | |
|---|---|---|---|
| 6,183,639 B1 | 2/2001 | de Winter |
| 2007/0095741 A1 | 5/2007 | Berends |
| 2009/0071894 A1 | 3/2009 | Chen |

OTHER PUBLICATIONS

International Search Report and Written Opinion for the International Application No. PCT/EP2022/062214, mailed Aug. 25, 2022, 10 pages.

*Primary Examiner* — Ekandra S. Miller-Cruz
(74) *Attorney, Agent, or Firm* — KDW Firm PLLC

(57) ABSTRACT
A membrane holder for hollow fibre membranes, in particular for applying in a tube filter, includes a central pipe having spaced apart bands of inlet openings formed along a circumference of the central pipe to flow liquid through the central pipe, holding elements arranged around the central pipe, which holding elements have radially extending wall parts distributed along the circumference of the central pipe, and closing parts extending between the free ends of the radially extending wall parts for confining a bundle of hollow fibre membranes between two adjacent radially extending wall parts and a closing part, and deflector plates concentrically arranged around and spaced apart from the central pipe and, when viewed in radial direction, covering the bands of inlet openings.

10 Claims, 3 Drawing Sheets

MEMBRANE HOLDER AND MEMBRANE MODULE

This application is a national stage filing under 35 U.S.C. 371 of pending International Application No. PCT/EP2022/062214, filed May 5, 2022, which claims priority to European patent application 21173853.9, filed May 14, 2021, the entirety of which applications are incorporated by reference herein.

The invention relates to a membrane holder for hollow fibre membranes, in particular for applying in a tube filter, comprising a central pipe having spaced apart bands of inlet openings formed along a circumference of the central pipe to flow liquid through the central pipe;

holding elements arranged around the central pipe, which holding elements have radially extending wall parts distributed along the circumference of the central pipe, and closing parts extending between the free ends of the radially extending wall parts for confining a bundle of hollow fibre membranes between two adjacent radially extending wall parts and a closing part.

Such a membrane holder is for example known from US 20090071894. In this publication a membrane module is disclosed which comprises a cylindrical housing through which a central pipe extends. This central pipe is provided with a plurality of inlet openings formed in the circumferential wall of the central pipe. Star shaped holding elements are arranged on the central pipe for holding bundles of hollow fibre membranes.

Water or another liquid, such as beer, wine, juices, dairy, etc., to be filtered is pumped via a header into the hollow fibre membranes and filtered liquid penetrates through the wall of the hollow fibre membranes and is discharged via the inlet openings in the central pipe.

After time, the hollow fibre membranes have filtered so much particles out of the liquid, that the hollow fibre membranes need to be cleaned. This is done by reversing the flow in the membrane module. Liquid is pumped through the central pipe and via the inlet openings into the space where the bundles of hollow fibre membranes are. The liquid then penetrates the hollow fibre membranes via the wall and is discharged via the header such that the filtered particles are back washed out of the hollow fibre membranes.

A problem is that when reversing the flow in the membrane module, the liquid flow is jetted out of the inlet openings in the central pipe. These jets of liquid can damage the hollow fibre membranes.

It is an object of the invention to reduce or even remove the above mentioned disadvantages.

This object is achieved according to the invention with a membrane holder according to the preamble, which is characterized by deflector plates concentrically arranged around and spaced apart from the central pipe and, when viewed in radial direction, covering the bands of inlet openings.

The deflector plates are spaced apart from the central pipe but cover the inlet openings when viewed in radial direction. This prevents, during back washing the filter module, that jets of liquid are directed directly onto the hollow fibre membranes. As a result a higher flow can be used for back washing the filter, without damaging the filter.

In a preferred embodiment of the membrane holder according to the invention the deflector plates are ring shaped and the inner wall is positioned equidistant from the outer surface of the central pipe.

Ring shaped deflector plates can easily be arranged around the central pipe and due to the equidistant positioning of the inner wall respective to the outer surface of the central pipe, all inlet openings will have a similar resistance when fluid is back washed through the filter.

Although the preferred cross-section of the central pipe is circular, the use of ring shaped deflector plates also allows for the use of different cross-sections, such as oval.

The ring shape of the deflector plate is strong shape, such that the pressure of the liquid jetted out of the inlet openings can easily be resisted.

In a further preferred embodiment of the membrane holder according to the invention the radially extending wall parts of a holding element are arranged to a respective ring shaped deflector plate.

With this embodiment, the ring shaped deflector plates can be slid over the central pipe into the correct position covering the bands of inlet openings. At the same time, the holding elements are positioned at a suitable spacing along the length of the central pipe to hold the bundles of hollow fibre membranes.

In another embodiment of the membrane holder according to the invention the central pipe is composed out of identical pipe parts, which each have at least one of the bands of inlet openings.

Using identical pipe parts for the central pipe allows for flexibility in length of the filter when assembling the filter and the membrane holder therefore.

Preferably, one end of each pipe part has a cylindrical portion with an outer diameter corresponding with the inner diameter of the other end of the pipe part.

This allows for the pipe parts to be slided partially into each other. By providing a small notch and groove on both pipe parts, a snap connection can be provided, such that coupled pipe parts do not easily fall apart.

In yet another preferred embodiment of the membrane holder at least one ring shaped deflector plate is arranged on each pipe part and wherein a longitudinal guide groove is arranged on one of the inner surface of the ring shaped deflector plate and the outer surface of the pipe part, wherein a rib is arranged on the other of the inner surface of the ring shaped deflector plate and the outer surface of the pipe part and wherein the rib extends into the guide groove.

The rib and groove provide a guide such that the ring shaped deflector plate with the holding element thereon is positioned at the correct angular position and such that all the holding elements along the length of the central pipe are aligned correctly.

In still a further embodiment of the membrane holder according to the invention each free end of the radially extending wall parts comprises two coupling members and wherein each closing part comprises on each end a closing member, wherein one closing member of a wall part and one closing member of the closing part provide a hinge of which the hinge axis is parallel to the central tube axis.

With the coupling members being hinges, one end of a closing member can be uncoupled, such that the closing member is hinged away over the other coupling member. This is of benefit when positioning the bundles of hollow fibre membranes into the holding elements.

Even further preferred is when the two coupling members on the free end of the radially extending wall are arranged coaxial with each other.

The invention further relates to a membrane module comprising:

a membrane holder according to the invention;

bundles of hollow fibre membranes arranged between each two adjacent radially extending wall parts and a closing part, wherein the bundles extend parallel to the central pipe;

at least one header arranged to one end of the bundles of hollow fibre membranes to feed a liquid, such as water, to the hollow fibre membranes;

a closing member arranged to the other end of the bundles of hollow fibre membranes for closing each hollow fibre membrane; and a housing arranged between the at least one header and the closing member, wherein the central pipe extends at least through one of the closing member or at least one header to discharge filtered liquid.

These and other features of the invention will be elucidated in conjunction with the accompanying drawings.

Figure 1:
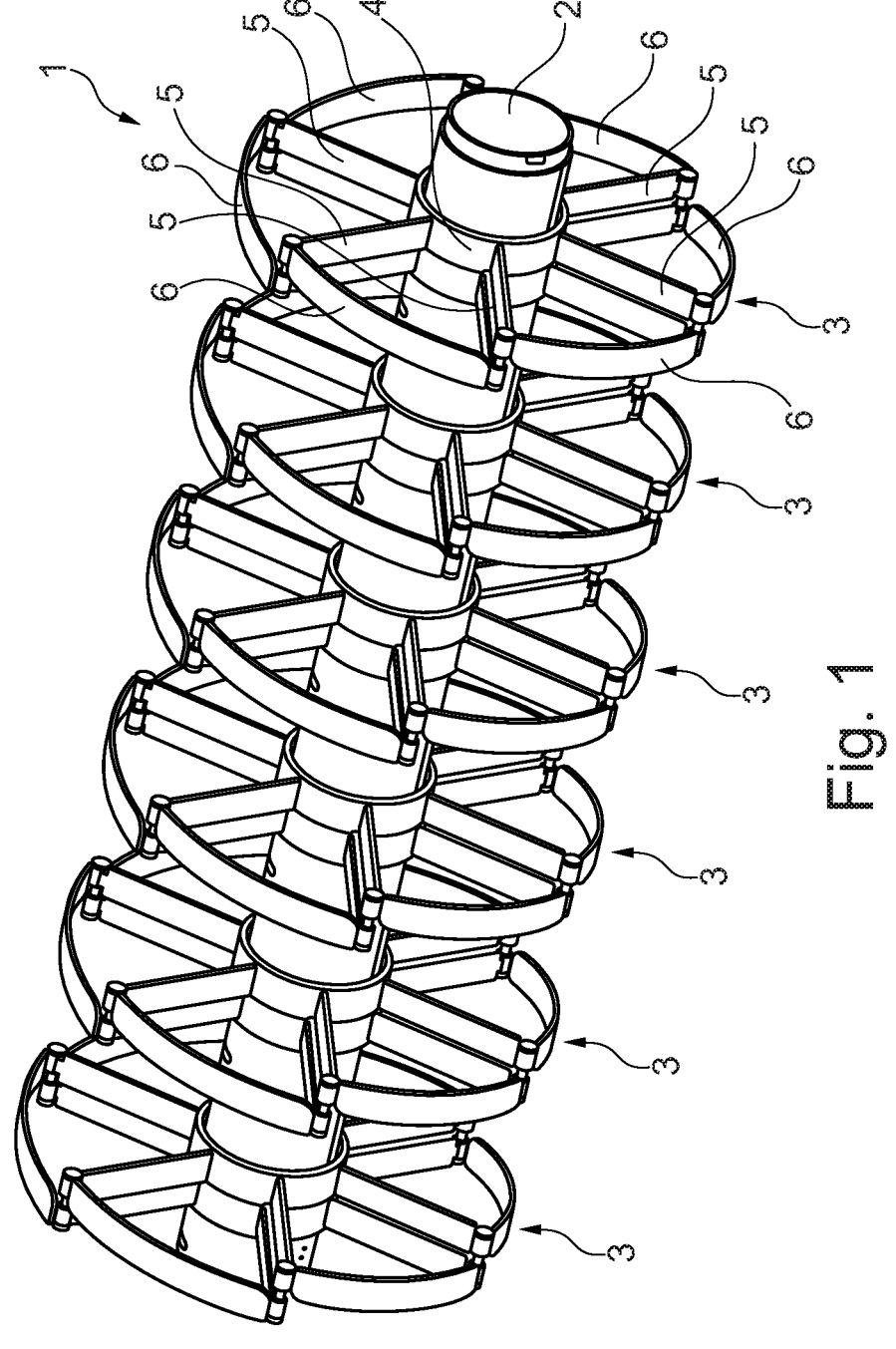
FIG. 1 shows a perspective view of a membrane holder according to the invention.

FIG. 1 shows a perspective view of a membrane holder 1 according to the invention. The membrane holder 1 has a central pipe 2 and holding elements 3 arranged around the central pipe 2 and spaced apart in axial direction.

Each holding element 3 has a ring shaped deflector plate 4 with radially extending wall parts 5. Closing parts 6 are coupled to the free ends of the wall parts 5.

Figures 2, 3:
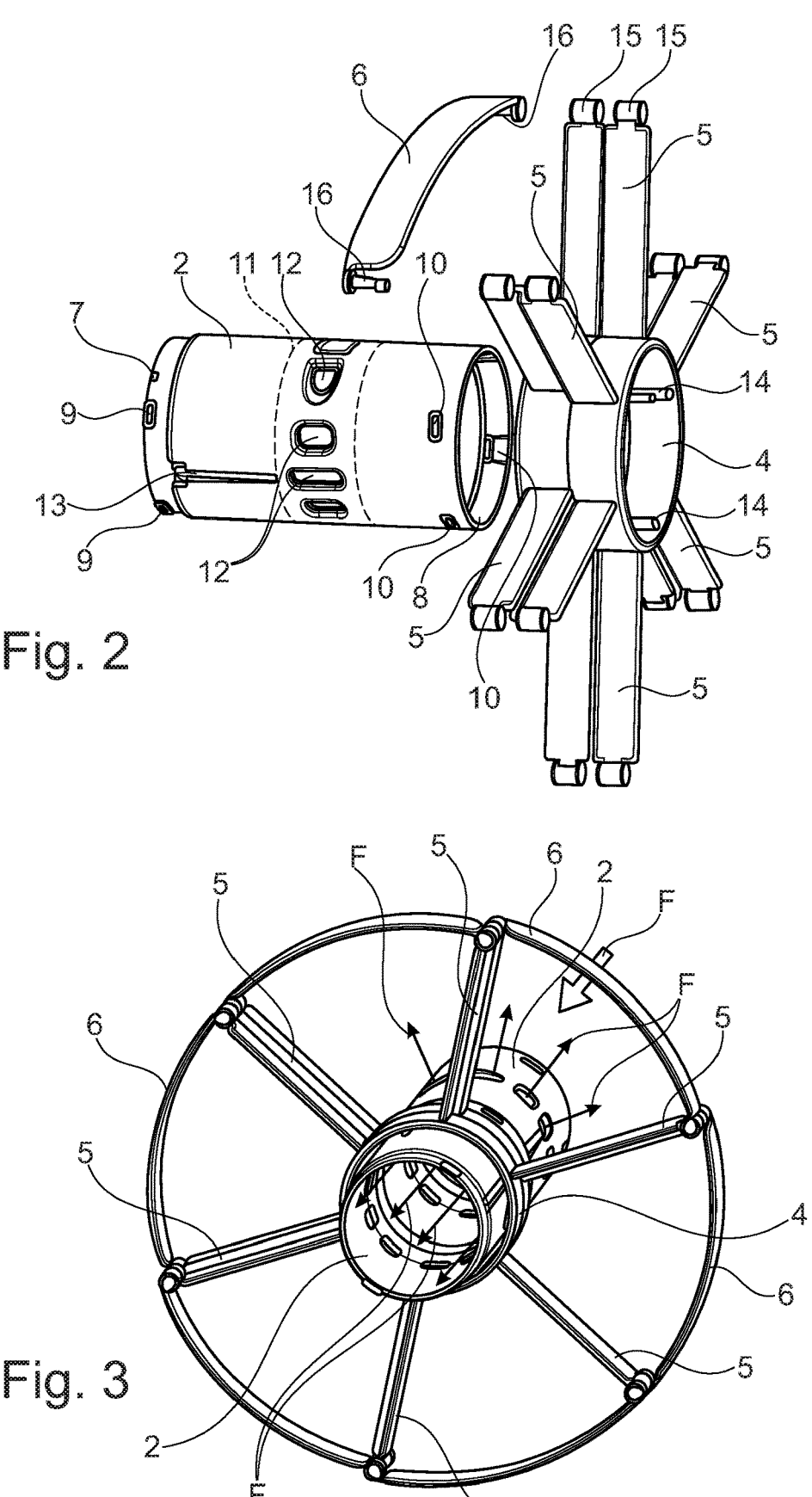
FIG. 2 shows an exploded view of the parts composing the membrane holder according to FIG. 1.
FIG. 3 shows the membrane holder of FIG. 1 with a number of parts removed.

FIG. 2 shows an exploded view of the parts composing the membrane holder 1 of FIG. 1. The central pipe 1 is composed out of pipe parts, which have on one end a cylindrical portion 7 which corresponds with the diameter of the inner wall 8 of the other end. The cylindrical portion 7 is provided with notches 9 which cooperate with grooves 10 of the other end on the inner wall 8 to provide a snap connection between pipe parts to compose the central pipe 2.

The pipe part 2 is provided with a band 11 of inlet openings 12, which discharge filtered liquid into the central pipe 2. Furthermore a axially extending groove 13 is arranged in the outer surface of the pipe part 2. This groove 13 cooperates with ribs 14 arranged on the inside of the ring shaped deflector plates 4. The ribs 14 ensure that the inner surface of the deflector plates 4 are at an equally spaced distance from the outside surface of the pipe part 2.

The free ends of the wall parts 5 are provided with a pair of cylindrical bushings 15, which are coaxially aligned. These bushings 15 couple with pins 16 which are arranged on both ends of the closing part 6 and provide a hinge.

FIG. 3 shows the parts of FIG. 2 assembled in combination with a second pipe part 2. When the filter module is back washed, a liquid flow F will be fed into the central pipe part 2. If no deflector plate is present (as shown on the second pipe part), the liquid will flow radially out of the pipe part 2. However, with the ring shaped deflector plate 4 positioned to cover the inlet openings 12, the liquid flow F will be deflected and flow out of the space between the pipe part 2 and deflector plate 4 in axial direction such that hollow fibre membranes held in bundles between the wall parts 5 and closing parts 6 are not damaged.

Figure 4:
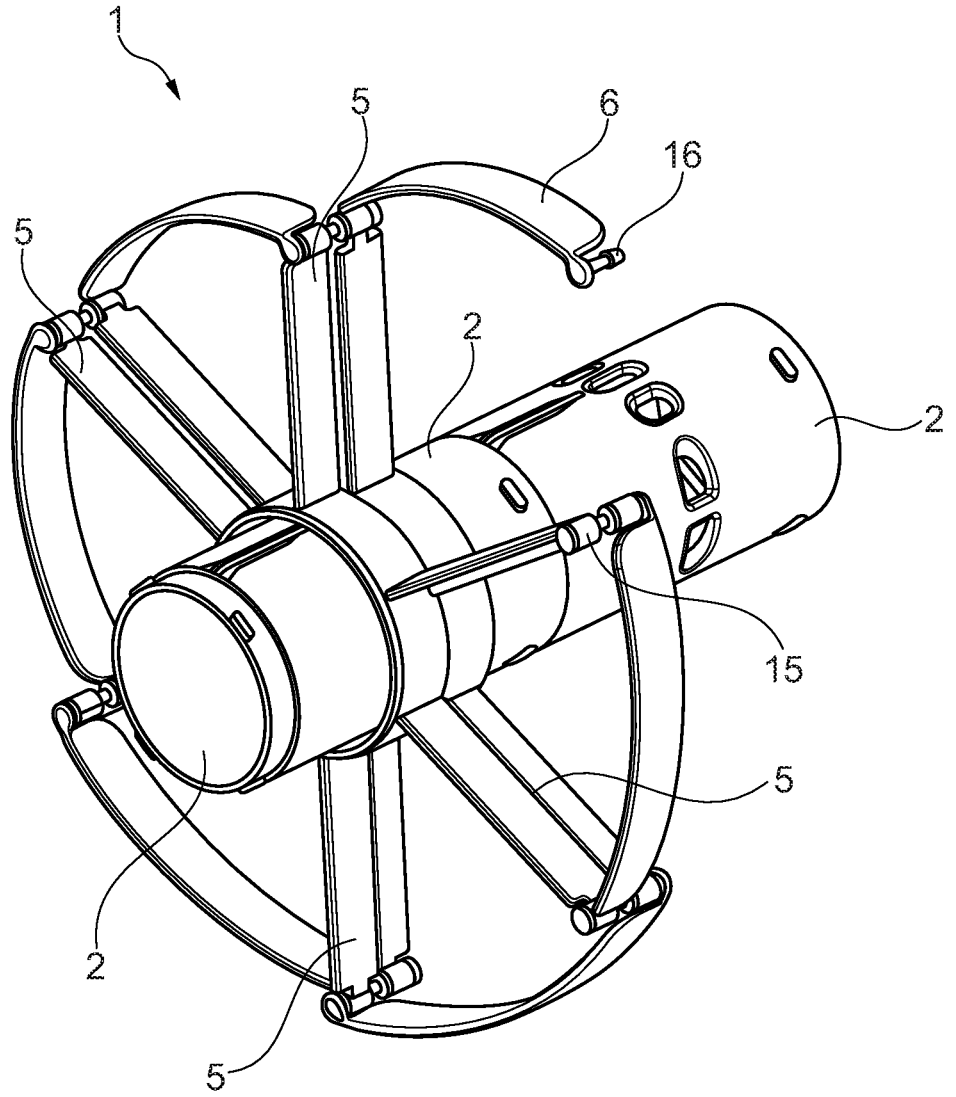
FIG. 4 shows the view of FIG. 3 with one opened closing part.

FIG. 4 shows the embodiment of FIG. 3 with one closing part 6 opened and hinged away. From this figure it is also clear that the central pipe is composed out of two pipe parts 2. By opening the closing part 6 along the full length of the central pipe 2, a bundle of hollow fibre membranes can be arranged in the membrane holder 1 and afterwards, the closing part 6 is closed again by shifting the pin 16 into the bushing 15 at the free end of the radial extending wall part 5.

The invention claimed is:

1. A membrane holder for hollow fibre membranes-comprising:

a central pipe having spaced apart bands of inlet openings formed along a circumference of the central pipe to flow liquid through the central pipe; and holding elements arranged around the central pipe, said holding elements having radially extending wall parts distributed along the circumference of the central pipe, and closing parts extending between free ends of the radially extending wall parts for confining a bundle of hollow fibre membranes between two adjacent radially extending wall parts and a closing part;

wherein deflector plates are concentrically arranged around and spaced apart from the central pipe and, when viewed in radial direction, covering the bands of inlet openings.

2. The membrane holder according to claim 1, wherein the deflector plates are ring shaped and wherein the inner wall is positioned equidistant from the outer surface of the central pipe.

3. The membrane holder according to claim 2, wherein the radially extending wall parts of a holding element are arranged to a respective ring shaped deflector plate.

4. The membrane holder according to claim 1, wherein the central pipe is composed of identical pipe parts, each of which having at least one of the bands of inlet openings.

5. The membrane holder according to claim 4, wherein one end of each pipe part has a cylindrical portion with an outer diameter corresponding with the inner diameter of the other end of the pipe part.

6. The membrane holder according to claim 3, wherein the central pipe is composed of identical pipe parts, each of which having at least one of the bands of inlet openings; wherein one end of each pipe part has a cylindrical portion with an outer diameter corresponding with the inner diameter of the other end of the pipe part; wherein at least one ring shaped deflector plate is arranged on each pipe part and wherein a longitudinal guide groove is arranged on the outer surface of the pipe part, and wherein a rib is arranged on the other of the inner surface of the ring shaped deflector plate and wherein the rib extends into the guide groove.

7. The membrane holder according to claim 1, wherein each free end of the radially extending wall parts comprises two coupling members and wherein each closing part comprises on each end a closing member, and wherein one closing member of a wall part and one closing member of the closing part provide a hinge of which the hinge axis is parallel to the central tube axis.

8. The membrane holder according to claim 7, wherein the two coupling members on the free end of the radially extending wall are arranged coaxial with each other.

9. A membrane module comprising:

a membrane holder according to claim 1;

bundles of hollow fibre membranes arranged between each two adjacent radially extending wall parts and a closing part, wherein the bundles extend parallel to the central pipe;

at least one header arranged to one end of the bundles of hollow fibre membranes to feed a liquid, such as water, to the hollow fibre membranes;

a closing member arranged to the other end of the bundles of hollow fibre membranes for closing each hollow fibre membrane; and a housing arranged between the at least one header and the closing member, wherein the central pipe extends at least through one of the closing member or at least one header to discharge filtered liquid.

10. The membrane holder according to claim 3, wherein the central pipe is composed of identical pipe parts, each of which having at least one of the bands of inlet openings; wherein one end of each pipe part has a cylindrical portion with an outer diameter corresponding with the inner diameter of the other end of the pipe part; wherein at least one ring shaped deflector plate is arranged on each pipe part and wherein a longitudinal guide groove is arranged on the inner surface of the ring shaped deflector plate, and wherein a rib is arranged on the outer surface of the pipe part and wherein the rib extends into the guide groove.

* * * * *